June 11, 1957 — W. G. TOLAND, JR — 2,795,599
BENZENE DICARBOXYLIC ACID PREPARATION
Filed Oct. 6, 1954
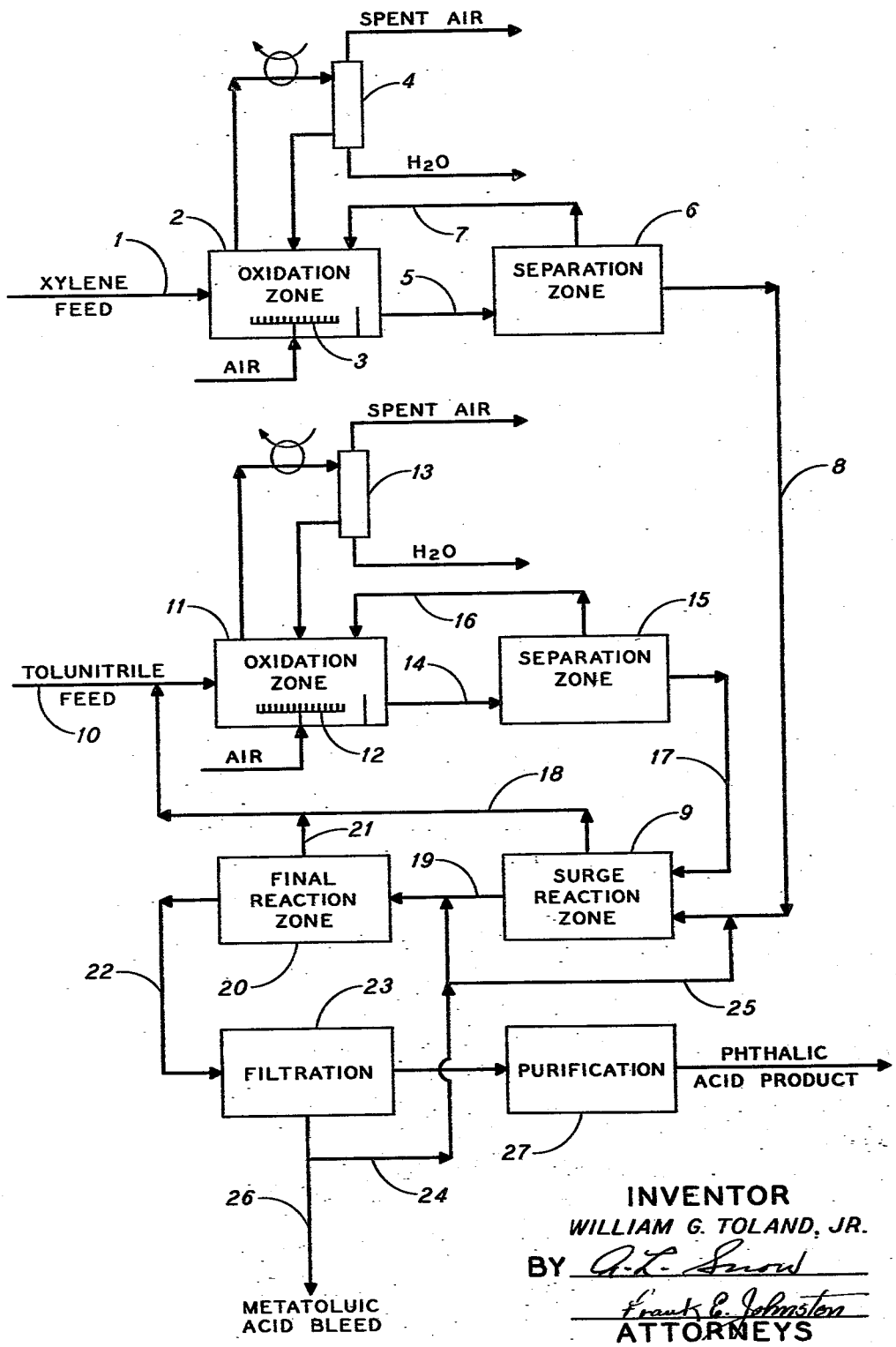
INVENTOR
WILLIAM G. TOLAND, JR.
BY
ATTORNEYS

United States Patent Office 2,795,599
Patented June 11, 1957

2,795,599
BENZENE DICARBOXYLIC ACID PREPARATION

William G. Toland, Jr., San Rafael, Calif., assignor to California Research Corporation, San Francisco, Calif., a corporation of Delaware Application October 6, 1954, Serial No. 460,748

5 Claims. (Cl. 260—465)

This invention relates to a process for producing benzene polycarboxylic acids. More particularly, it relates to a process in which a lower polyalkylbenzene is converted to the corresponding benzene polycarboxylic acid.

Pursuant to the invention, a lower alkylbenzene nitrile, or polynitrile, is contacted with a gas containing elemental oxygen as the effective oxidizing agent at a temperature in the range from about 250 to 500° F. for a time sufficient to cause substantial oxidation of the alkyl group to produce a cyano aromatic acid, i. e., the corresponding aromatic acid of the alkylbenzene nitrile having the carboxyl group bonded to a nuclear carbon atom. A lower polyalkylbenzene is also contacted with a gas containing elemental oxygen as the effective oxidizing agent at 250 to 500° F. for a time sufficient to convert a substantial proportion of the polyalkylbenzene to an alkylbenzene monocarboxylic acid. The two oxidation reaction products containing an excess of the alkylbenzene monocarboxylic acid are then mixed and heated at a temperature in the range from about 350 to 750° F., preferably 450 to 650° F., to effect an interchange of position by the nitrile group of one oxidation product and the carboxyl group of the other oxidation product, and thereby to produce the desired benzene polycarboxylic acid and a lower alkylbenzene nitrile. The interchange of position is an equilibrium reaction which is driven to completion by continuous removal of one of the products, generally the more volatile lower alkylbenzene nitrile which may be recycled for further oxidation. The benzene polycarboxylic acid is separated from the excess alkylbenzene monocarboxylic acid by conventional means, such as by fractional distillation or crystallization and filtration.

The present invention may be more clearly understood by reference to the accompanying drawing, which is a schematic flow diagram illustrating a process flow suitable for use in the practice of this invention. It illustrates the oxidation of a lower polyalkylbenzene to the corresponding alkylbenzene monocarboxylic acid in a first oxidation zone; oxidation of a lower alkylbenzene nitrile to a carboxy benzonitrile in a second oxidation zone; mixing and heating of the oxidation reaction products and interaction between them to form a benzene polycarboxylic acid and a lower alkylbenzene nitrile; recovery of the benzene polycarboxylic acid; and the recycling of the lower alkylbenzene nitrile to the second oxidation zone.

In the process illustrated by the drawing, metaxylene feed is introduced through line 1 into a first oxidation zone 2, which is maintained at a temperature of about 300° F. and a pressure of about 50 p. s. i. g. Air is introduced into the oxidation zone 2 through a spider comprised of multiple small orifices 3 at a rate of approximately 5 to 20 cu. ft. per pound of feed per hour. The oxidation zone 2 is equipped with a condenser and separator system 4 to allow the removal of spent air and water vapor and to return vaporized xylene and meta toluic acid to the oxidation zone. The oxidation products, comprised primarily of meta toluic acid with some unreacted xylene, are removed through line 5 to a separation zone 6, wherein xylene is separated from the toluic acid by conventional means such as fractional distillation or fracitonal crystallization. The xylene is then returned through line 7 to the first oxidation zone 2. The toluic acid is transferred through line 8 to the surge reaction zone 9.

Metatolunitrile feed is introduced through line 10 into a second oxidation zone 11, which is maintained at a temperature of about 350° F. and atmospheric pressure. Air is introduced into the oxidation zone 11 through a spider comprised of multiple small orifices 12 at a rate of approximately 0.5 to 10 cu. ft. per pound of feed per hour. The oxidation zone 11 is equipped with a condenser and separator system 13 to allow removal of spent air and water vapor and to return vaporized metatolunitrile and oxidation products to the oxidation zone. The oxidation products, comprised primarily of metacyanobenzoic acid with some unreacted meta-tolunitrile, are removed through line 14 to a separation zone 15, wherein the unreacted tolunitrile is separated from the oxidation products by conventional means, such as fractional distillation or fractional crystallization. The metatolunitrile is then returned through line 16 to the second oxidation zone 11. The oxidation products containing a high proportion of metacyanobenzoic acid are then transferred through line 17 to the surge reaction zone 9.

The mixture in the surge reaction zone 9 containing the oxidation products of metatolunitrile dissolved in a molar excess of metatoluic acid is reacted at a temperature of about 480° F. at atmospheric pressure to effect an interchange of position between the nitrile group of the metatolunitrile oxidation product and the carboxyl group of the metatoluic acid.

The metatolunitrile reaction product is continuously removed as a vapor through line 18 and recycled to the second oxidation zone 11. The isophthalic acid products, together with the remaining unreacted oxidation products in the medium of excess metatoluic acid, is removed through line 19 to a final reaction zone 20 at a temperature of 480° F. at atmospheric pressure, where the nitrile-carboxyl interchange is completed essentially quantitatively. Gaseous metatolunitrile is removed continuously through line 21 and recycled to the second oxidation zone 11. The isophthalic acid dissolved in excess metatoluic acid, is removed through line 22 to a separation chamber 23, where separation is effected by cooling to allow fractional crystallization and filtration. The metatoluic acid is then returned to the system through lines 24 and 25. If desired, a portion of the recovered metatoluic acid can be bled through line 26 for purification from contaminating by-products before return to the system. The filter cake of isophthalic acid is purified by removing traces of the metatoluic acid by slurrying with hot water, hot xylene, or both, and separating the isophthalic acid by filtration at filter 27. The purification may also be accomplished by heating the filter cake to drive off toluic acid as vapor.

Example I

Terephthalic acid has been prepared in accordance with the present invention using parazylene and paratolunitrile as the starting materials.

The paraxylene was oxidized to paratoluic acid by subjecting it to contact with air for two hours at a temperature of 300° F. and a pressure of 50 p. s. i. g., using ½% by weight of cobalt naphthenate as a catalyst. The paratolunitrile was oxidized by subjecting it to contact with air for 15 hours at a temperature of 350° F. at atmospheric pressure, using ½% by weight of benzaldehyde as an initiator and ½% by weight of cobalt naphthenate as a catalyst. The two oxidation reaction products were mixed and heated at 480° F. at atmospheric pressure for three hours. The interchange of position by the nitrile and carboxyl groups was essentially quantitative to produce terephthalic acid and paratolunitrile, which was continuously removed as a vapor and recycled to the paratolunitrile oxidation zone.

Example II

Isophthalic acid has been prepared in accordance with the present invention using metaxylene and metatolunitrile as the starting materials.

The metaxylene was oxidized to metatoluic acid by subjecting it to contact with air for two hours at a temperature of 300° F. and a pressure of 50 p. s. i. g., using 1% by weight of cobalt naphthenate as a catalyst. The metatolunitrile was oxidized by subjecting it to contact with air for 15 hours at a temperature of 325° F. at atmospheric pressure, using ½% by weight of benzaldehyde as an initiator and ½% by weight of cobalt naphthenate as a catalyst. The two oxidation reaction products were mixed and heated at 480° F. at atmospheric pressure for three hours. The interchange of position by the nitrile and carboxyl groups was essentially quantitative to produce isophthalic acid and metatolunitrile, which was continuously removed as a vapor, and recycled to the metatolunitrile oxidation zone.

*Example III*

3-methyl isophthalic acid has been prepared in accordance with the present invention using mesitylene and 3,5-dimethyl benzonitrile as the starting materials.

The mesitylene was oxidized to mesitylenic acid by subjecting it to contact with air for two hours at a temperature of 300° F. and a pressure of 50 p. s. i. g., using ½% by weight of cobalt toluate as a catalyst. The 3,5-dimethyl benzonitrile was oxidized by subjecting it to contact with air for 20 hours at a temperature of 400° F. at atmospheric pressure, using ½% by weight of benzaldehyde as an initiator and 1% by weight of cobalt toluate as a catalyst. The two oxidation reaction products were mixed and heated at 525° F. at atmospheric pressure for three hours. The interchange of position by the nitrile and carboxyl groups was essentially quantitative to produce 3-methyl isophthalic acid and 3,5-dimethyl benzonitrile, which was continuously removed and recycled to the 3,5-dimethyl benzonitrile oxidation zone.

In the practice of the present invention, the amides or ammonium salts of lower alkylbenzene carboxylic acids may be substituted for the lower alkylbenzene nitriles. Both the amides and the ammonium salts are dehydrated to the corresponding nitriles in the heated oxidation zone; following this initial conversion they remain as nitriles so as to enter into reactions analogous to those of the preceding examples.

*Example IV*

Terephthalic acid has been prepared in accordance with the present invention using paraxylene and poratoluamide as the starting materials. The paraxylene was oxidized to paratoluic acid in a first oxidation zone by the procedure described in Example I. The paratoluamide was simultaneously dehydrated to paratolunitrile and oxidized in a second oxidation zone by subjecting it to contact with air for 15 hours at a temperature of 375° F. at atmospheric pressure using ½% by weight of benzaldehyde as an initiator and ½% by weight of cobalt naphthenate as a catalyst. The two oxidation reaction products were mixed and heated at 480° F. at atmospheric pressure for 3 hours. The interchange of position by the nitrile and carboxyl groups was essentially quantitative to produce terephthalic acid and paratolunitrile, which was continuously removed as a vapor, and recycled to the second oxidation zone.

*Example V*

Terephthalic acid was prepared in accordance with the present invention using paraxylene and ammonium paratoluate as the starting materials.

The paraxylene was oxidized to paratoluic acid in a first oxidation zone by the procedure described in Example I. The ammonium paratoluate was simultaneously dehydrated to paratolunitrile and oxidized in a second oxidation zone by subjecting it to contact with air for 15 hours at a temperature of 425° F. at atmospheric pressure using ½% by weight of benzaldehyde as an initiator and ½% by weight of cobalt naphthenate as a catalyst. The two oxidation reaction products were mixed and heated at 480° F. at atmospheric pressure for 3 hours. The interchange of position by the nitrile and carboxyl groups was essentially quantitative to produce terephthalic acid and paratolunitrile, which was continuously removed as a vapor, and recycled to the second oxidation zone.

In addition to the lower polyalkylbenzenes employed in the preceding examples, it has been found that trimethylbenzenes, methylethylbenzenes, diethylbenzenes, triethylbenzenes, methylpropylbenzenes, methylisopropylbenzenes, and the like are suitable for use as the lower polyalkylbenzene feed.

Likewise, it has been found that in addition to the alkylbenzene nitriles illustrated in the examples, dimethylbenzo-nitriles, trimethylbenzo-nitriles, ethylbenzo-nitriles, diethylbenzo-nitriles, triethylbenzo-nitriles, propylbenzo-nitriles, isopropylbenzo-nitriles, methylbenzo-dinitriles, and the like are suitable for use as the lower alkylbenzene nitrile feed.

Pursuant to the invention, benzene polycarboxylic acids can be produced by initially mixing and heating a benzene polynitrile together with the lower alkylbenzene monocarboxylic acid resulting from the oxidation of a lower polyalkylbenzene. Following the interchange of the carboxyl and nitrile groups, the benzene polycarboxylic acid and the lower alkylbenzene nitrile may be separated by conventional means, such as fractional distillation. The lower alkylbenzene nitrile product may then be recycled for oxidation in the manner described in the preceding examples.

The amides or ammonium salts of benzene polycarboxylic acids can be employed as starting materials analogously to benzene polynitriles, since these amides or ammonium salts can be dehydrated to the corresponding polynitrile in the heated reaction zone or immediately prior to introduction therein. Similarly, mixtures of amides and ammonium salts can be employed as starting materials.

*Example VI*

Isophthalic acid has been prepared in accordance with the present invention using metaxylene and a mixture comprised of isophthalic monamide, isophthalamide, the ammonium salt of isophthalic monamide, monoammonium isophthalate, and diammonium isophthalate as the starting materials.

The metaxylene is oxidized to metatoluic acid in a first reaction zone as described in Example II. The amide-ammonium salt mixture is then mixed with excess metatoluic acid and heated to a temperature of 425° F. in a second reaction zone at atmospheric pressure so as to dehydrate the amide and ammonium salt groups to nitrile groups, and then to effect an interchange between the nitrile groups and the carboxyl groups of the toluic acid. The metatolunitrile is removed continuously as a vapor, thereby making the interchange reaction essentially quantitative. The isophthalic acid is separated from the metatoluic acid medium by fractional crystallization and filtration. If desired, the oxidation of metaxylene to isophthalic acid may be sustained after initiation with the amide-ammonium salt mixture by recycling the metatolunitrile to an oxidation zone, followed by a mixing and heating of the oxidation product with fresh metatoluic acid in the manner of Example II.

If it is desired to minimize the production of mixed benzene polycarboxylic acids, the starting materials, i. e. the lower alkylbenzene nitrile and the lower polyalkylbenzene, should be selected having similar groups substituted in similar positions on the benzene nucleus, except for the existence of the nitrile in place of one of the lower alkyl groups. Accordingly, terephthalic acid would be best produced pursuant to the invention by the employment of paraxylene and paratolunitrile or terephthalonitrile as starting materials; similarly, isophthalic acid would be best produced by the use of metaxylene and metatolunitrile or isophthalo-nitrile as starting materials. The use of paraxylene and metatolunitrile, for example, would result in a mixed initial product of terephthalic and isophthalic acids.

Reaction conditions for the oxidation of the lower polyalkylbenzene can be varied widely, but it is preferred to carry out the oxidation to the alkylbenzene monocarboxylic acid at temperatures in the range from 250 to 500° F. at pressures from atmospheric to 300 p. s. i. g. Multi-valent metals which are capable of changing their valence structure at reaction temperatures are useful catalysts. These metals are introduced into reaction mixtures in the form of salts, which are appreciably soluble in the polyalkylbenzene feed. Oil-soluble compounds of cobalt, manganese, chromium, nickel, and lead are all effective catalysts in the process, the cobalt compounds, such as cobalt toluate or cobalt naphthenate being preferred. The reaction time usually ranges from 1 to 3 hours, but may be longer depending upon the conditions and the degree of conversion desired.

Conditions of temperature and pressure near the upper limit of the ranges described may be preferred when it is necessary to oxidize an ethyl or propyl group attached to the ring to form the aromatic monocarboxylic acid having the carboxyl group bonded to a nuclear carbon atom.

Reaction conditions for the oxidation of the lower alkyl-benzene nitrile are likewise not to be regarded as limited to those set forth in the examples. Oxidation of the alkyl group to produce an aromatic acid nitrile can be accomplished within a temperature range of 250 to 500° F. at pressures ranging from atmospheric to 300 p. s. i. g. Satisfactory yields have been obtained at about 350° F. and atmospheric pressure using the same organo-metallic catalysts as described for the oxidation of the lower polyalkyl benzene. The reaction time may range from 0.5 to 20 hours, depending upon the degree of conversion desired.

As before, conditions of temperature and pressure near the upper limit of the ranges described may be preferred when it is necessary to oxidize an ethyl or propyl group attached to the ring to the cyano-aromatic monocarboxylic acid having the carboxyl group bonded to a nuclear carbon atom.

The interchange of the nitrile and carboxyl groups between the oxidation reaction products to form the desired benzene polycarboxylic acid can likewise be effected under varying conditions. Although the most favorable extent of interchange has been observed to occur under the preferred conditions of about 480° F. at atmospheric pressure, the reaction will proceed satisfactorily within a temperature range of 350 to 750° F. This reaction is ordinarily conducted at atmospheric pressure and the alkyl cyanobenzene product is removed from the reaction zone continuously for recycle, thereby driving the interchange equilibrium reaction to completion. Sub-atmospheric pressures may be employed to facilitate removal of the alkyl cyanobenzene product if desired; the process is also operable at moderately super-atmospheric pressures. The presence of a molten excess of alkylbenzene monocarboxylic acid during the interchange reaction is preferred both to provide a convenient medium for the reaction and to shift the equilibrium in favor of the desired benzene polycarboxylic acid product.

It has been observed that the interchange reaction is effectively catalyzed by acidic inorganic compounds, such as $NaHSO_4$, $H_2SO_4$, or $(NH_4)_2SO_4$ present in amounts of about 0.1 to 1.0 weight percent. Using such catalysts, the time required for essentially quantitative reaction, assuming continued removal of the nitrile-containing product, usually ranges from 1½ to 3 hours.

I claim:

1. Process for producing benzene dicarboxylic acids which comprises subjecting a lower alkylbenzene nitrile to contact with elemental oxygen at a temperature in the range of about 250 to 500° F. for a time sufficient to cause substantial oxidation of the alkyl group, subjecting a lower polyalkylbenzene to contact with elemental oxygen at 250 to 500° F. for a time sufficient to convert a substantial proportion of the polyalkylbenzene to alkylbenzene monocarboxylic acid and heating the two oxidation reaction products together at a temperature of 350 to 750° F. to produce a benzene dicarboxylic acid and a lower alkylbenzene nitrile.

2. Process for producing benzene dicarboxylic acid which comprises subjecting a lower alkylbenzene nitrile to contact with elemental oxygen in a first oxidation zone at a temperature in the range of about 250 to 500° F. for a time sufficient to cause substantial oxidation of the alkyl group, subjecting a lower polyalkylbenzene to contact with elemental oxygen in a second oxidation zone at 250 to 500° F. for a time sufficient to convert a substantial proportion of the polyalkyl benzene to alkylbenzene monocarboxylic acid and heating the two oxidation reaction products together at a temperature of 350 to 750° F. to produce a benzene dicarboxylic acid and a lower alkylbenzene nitrile, separating the benzene dicarboxylic acid from the lower alkylbenzene nitrile and recycling the lower alkylbenzene nitrile to the first oxidation zone.

3. Process for producing benzene dicarboxylic acids which comprises subjecting a lower alkylbenzene nitrile and a lower polyalkylbenzene to contact with elemental oxygen in a common oxidation zone at a temperature in the range of about 250 to 500° F. for a time sufficient to oxidize a substantial portion of the lower alkyl group of the lower alkylbenzene nitrile and sufficient to oxidize a substantial portion of the polyalkyl benzene to alkylbenzene monocarboxylic acid, heating the two oxidation reaction products together at a temperature of 350 to 750° F. to produce a benzene dicarboxylic acid and a lower alkylbenzene nitrile, recovering the benzene dicarboxylic acid and recycling the lower alkylbenzene nitrile to the oxidation zone together with a charge of fresh lower polyalkylbenzene.

4. Process for producing benzoic dicarboxylic acid which comprises subjecting a lower alkylbenzene nitrile to contact with elemental oxygen in a first oxidation zone at a temperature in the range of about 250 to 500° F. for a time sufficient to cause substantial oxidation of the alkyl group, subjecting a lower polyalkylbenzene to contact with elemental oxygen in a second oxidation zone at 250 to 500° F. for a time sufficient to convert a substantial proportion of the polyalkyl benzene to alkylbenzene monocarboxylic acid, passing the two oxidation reaction products into a conversion zone, maintaining a large molar excess of the alkylbenzene monocarboxylic acid in the conversion zone, heating the two oxidation reaction products and excess acid in the conversion zone to a temperature of 350 to 750° F. to produce a benzene dicarboxylic acid and a lower alkylbenzene nitrile, separating the lower alkylbenzene nitrile and recycling the lower alkylbenzene nitrile to the first oxidation zone and separating the benzene dicarboxylic acid from the excess alkylbenzene monocarboxylic acid by fractional crystallization and filtration and recycling the alkylbenzene monocarboxylic acid to the conversion zone.

5. Process for producing phthalic acids which comprises subjecting a tolunitrile to contact with elemental oxygen at a temperature in the range of about 250 to 500° F. for a time sufficient to cause substantial oxidation of the methyl group, subjecting a xylene to contact with elemental oxygen at 250 to 500° F. for a time sufficient to convert a substantial proportion of the xylene to a toluic acid, and heating the two oxidation reaction products together at a temperature of 350 to 750° F. to produce a phthalic acid and a tolunitrile.

No references cited.